(12) United States Patent
Kogo

(10) Patent No.: US 9,981,181 B2
(45) Date of Patent: May 29, 2018

(54) GAMING APPARATUS AND METHOD OF CONTROLLING IMAGE DISPLAY OF GAMING APPARATUS

(75) Inventor: Junichi Kogo, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 900 days.

(21) Appl. No.: 11/822,866

(22) Filed: Jul. 10, 2007

(65) Prior Publication Data

US 2008/0088598 A1   Apr. 17, 2008

(30) Foreign Application Priority Data

Jul. 11, 2006 (JP) ................................ 2006-190724

(51) Int. Cl.
- *A63F 13/2145* (2014.01)
- *A63F 13/40* (2014.01)
- *G06F 3/0488* (2013.01)

(52) U.S. Cl.
CPC .......... *A63F 13/2145* (2014.09); *A63F 13/10* (2013.01); *G06F 3/0488* (2013.01); *A63F 2300/1075* (2013.01); *A63F 2300/8047* (2013.01)

(58) Field of Classification Search
USPC .................... 345/173–179; 178/18.01–18.11, 178/19.01–19.07
See application file for complete search history.

(56) References Cited

U.S. PATENT DOCUMENTS 7,578,742 B2 * 8/2009 Miyamoto et al. ............. 463/37

FOREIGN PATENT DOCUMENTS

| JP | 2005-131298 | 5/2005 |
|---|---|---|
| JP | 2005-204754 | 8/2005 |
| JP | 2005-211242 | 8/2005 |
| JP | 2006-34754 | 2/2006 |

* cited by examiner

*Primary Examiner* — Kenneth B Lee, Jr.
(74) *Attorney, Agent, or Firm* — Lex IP Meister, PLLC

(57) ABSTRACT

A gaming apparatus includes a display, a touch panel, and a controller. The display displays an image thereon. The touch panel is provided so as to cover a display screen of the display and outputs a position signal corresponding to a point touched by a player. The controller receives the position signal from the touch panel and changes the image in accordance with the number of position signals simultaneously received.

9 Claims, 5 Drawing Sheets

GAMING APPARATUS AND METHOD OF CONTROLLING IMAGE DISPLAY OF GAMING APPARATUS

CROSS REFERENCE TO RELATED APPLICATION

This application is based upon and claims the benefit of priority from the prior Japanese Patent Application No. 2006-190724, filed on Jul. 11, 2006, the entire contents of which are incorporated herein by reference.

BACKGROUND OF THE INVENTION

1. Field of the Invention

The present invention relates to a gaming apparatus using a touch panel, and also to a method of controlling image display of the gaming apparatus.

2. Description of Related Art

Various gaming apparatuses that allow many operations to be performed by use of a touch panel are now appearing.

For example, according to a gaming apparatus disclosed in Japanese Unexamined Patent Publication No. 2006-34754, a player touches a touch panel with two of his/her fingers at one time, and changes a distance or an angle between two touched points thereby operating a player character.

SUMMARY OF THE INVENTION

In the above-mentioned gaming apparatus, however, a game feature obtainable from a touch-panel input is limited because it is a mere substitutional use of two fingers for a controller in performing operations for a game.

An object of the present invention is to provide a gaming apparatus that can improve a game feature obtainable from a touch-panel input, and also provide a method of controlling an image display of the gaming apparatus.

According to a first aspect of the present invention, there is provided a gaming apparatus including a display, a touch panel, and a controller. The display displays an image thereon. The touch panel is provided so as to cover a display screen of the display and outputs a position signal corresponding to a point touched by a player. The controller receives the position signal from the touch panel and changes the image in accordance with the number of position signals simultaneously received.

According to a second aspect of the present invention, there is provided a method of controlling image display of a gaming apparatus. The method includes the steps of receiving a position signal from a touch panel that is provided so as to cover a display screen of a display on which an image is displayed and outputs the position signal corresponding to a point touched by a player, and changing the image in accordance with the number of position signals simultaneously received.

In the first and second aspects, an image displayed on the display is changed in accordance with the number of position signals simultaneously received, that is, the number of points on the touch panel simultaneously touched. For example, an image displayed when the touch panel is touched with one finger and an image displayed when the touch panel is touched simultaneously with two fingers are different from each other. This can provide a player with a game feature based on a visible change, thus improving a game feature obtainable from a touch-panel input.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

In the following, a certain preferred embodiment of the present invention will be described with reference to the accompanying drawings.

Figure 1:
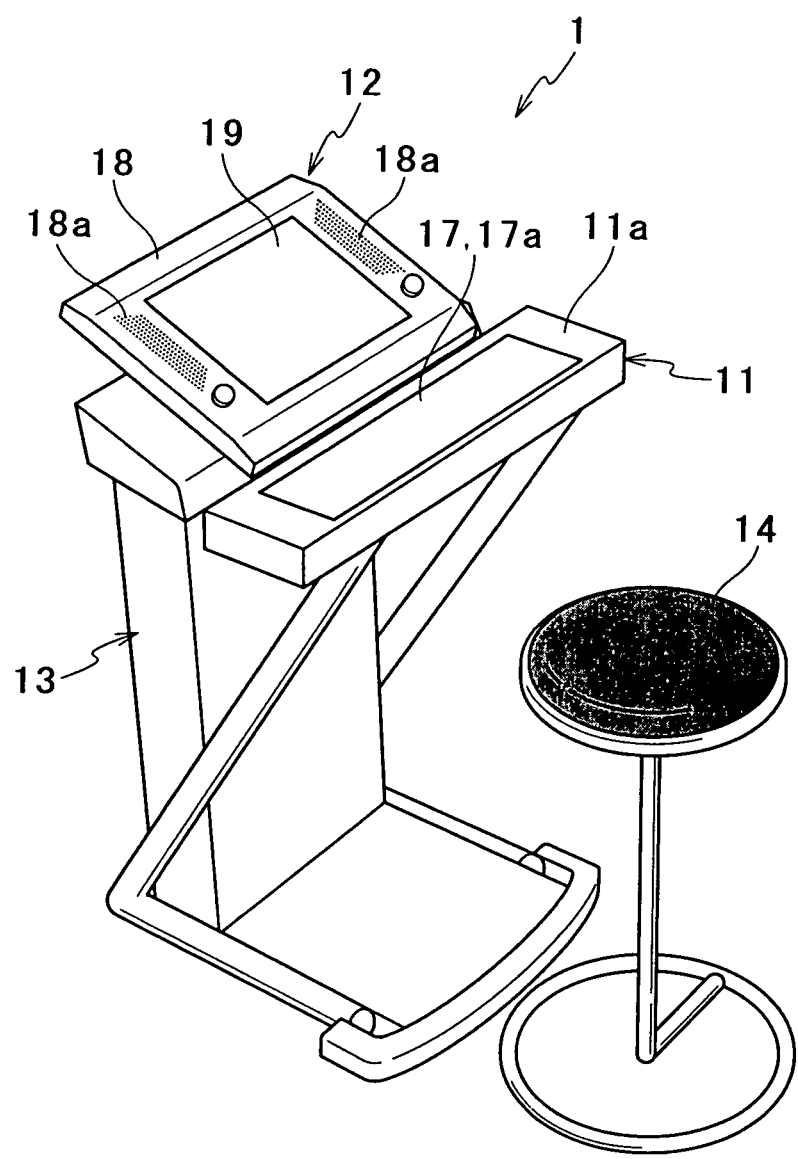
FIG. 1 is a perspective view showing a gaming apparatus according to an embodiment of the present invention.

First, a mechanical structure of a gaming apparatus 1 will be described. As shown in FIG. 1, the gaming apparatus 1 has a chair 14, a front display device 11, a rear display device 12, and a supporter 13. The chair 14, on which a player sits, is disposed on a front side. The front display device 11 is opposed to the chair 14. The rear display device 12 is disposed behind the front display device 11. The supporter 13 supports the front display device 11 and the rear display device 12.

The front display device 11 includes a horizontal control surface 11a. The control surface 11a has a first liquid crystal display (hereinafter referred to as a "first LCD") 17, and a touch panel 17a. The first LCD 17 displays thereon an image simulating a piano keyboard (see FIGS. 2A, 2B, 3A, and 3B). The touch panel 17a is disposed so as to cover a display screen of the first LCD 17. The touch panel 17a is made of a transparent material to allow a player to view the display screen of the first LCD 17 through the touch panel 17a. The touch panel 17a outputs a position signal that corresponds to a point touched by a player. A medal insertion slot (not shown) is provided on a side face of the front display device 11.

In order that a player sitting on the chair 14 can easily view the rear display device 12, the rear display device 12 is disposed in such a manner that a height of its front end is at the same level as a height of the front display device 11 and in addition the rear display device 12 is inclined upward from its front end to its rear end. The rear display device 12 has a second liquid crystal display (hereinafter referred to as a "second LCD") 19, a support frame 18 that supports the second LCD 19, and a speaker grill 18a that is formed on both side portions of the support frame 18. The second LCD 19 displays thereon images relating to a game, such as a music score, scoring points, a character, and the like. A sound outputted from a speaker 32 (see FIG. 4), which is provided on a rear face of the support frame 18, passes through the speaker grill 18a.

Figure 2A:
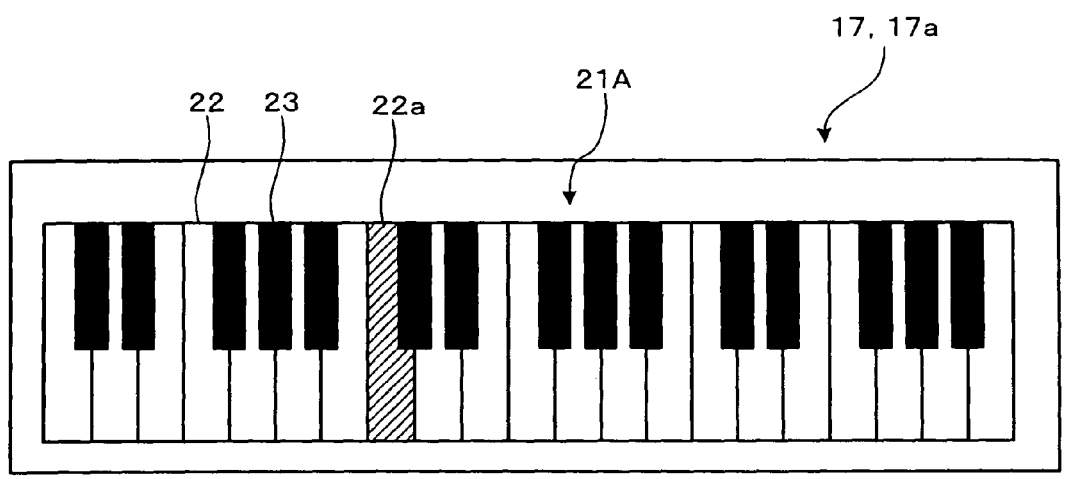
FIG. 2A is a schematic diagram showing one exemplary keyboard image that is navigating a do-key image.
Figure 3A:
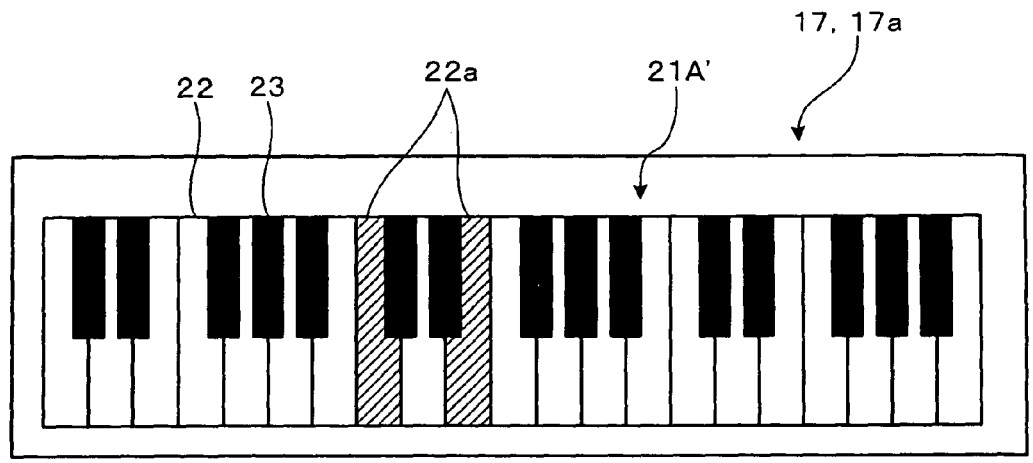
FIG. 3A is a schematic diagram showing one exemplary keyboard image that is navigating a do-key image and a mi-key image.

As shown in FIGS. 2A and 3A, a keyboard image 21A, 21A' including white key images 22 and black key images 23 is displayed on the display screen of the first LCD 17. Here, the white key images 22 and the black key images 23 will be called key images as a whole. A normal display color of the white key images 22 is white, and a normal display color of the black key images 23 is black. In this embodiment, a key image 22, 23 to be touched by a player is navigated and displayed as a red key image 22a.

The gaming apparatus 1 presents a musical game. In the musical game, a certain piece of music is automatically played with piano. During this piano play, a tone corresponding to a key to be touched by a player with his/her right index finger or tones corresponding to two keys to be simultaneously touched by a player with his/her right index finger and right middle finger is/are skipped. At this time, a key image to be touched by a player with his/her right index finger or two key images to be touched by a player with his/her right index finger and right middle finger is/are navigated by being displayed in red. As the player touches the touch panel 17a with his/her right index finger or his/her right index and middle fingers in accordance with navigation, the tone(s) corresponding to the touched key image(s) is/are outputted from the speaker 32 so that the piece of music is played in a full version.

To be more specific, in an example case where a piece of music is automatically played in an order of "do", "re", and "do and mi", a first "do" tone and a third "do and mi" chord are skipped and consequently only the second "re" tone is outputted from the speaker 32. At a timing of the first "do" tone, a "do" key image 22 is navigated and displayed as a red key image 22a. At a timing of the third "do and mi" tones, two "do" and "mi" key images 22 are navigated and displayed as red key images 22a. As a player touches with his/her right index finger the key image 22a that is navigated at the timing of the first "do" tone, a "do" tone is outputted from the speaker 32. As the player touches with his/her right index and middle fingers the key images 22a that are navigated at the timing of the third "do and mi" tones, a "do and mi" chord is outputted from the speaker 32. Thus, a complete form of the piece of music is played.

Figure 2B:
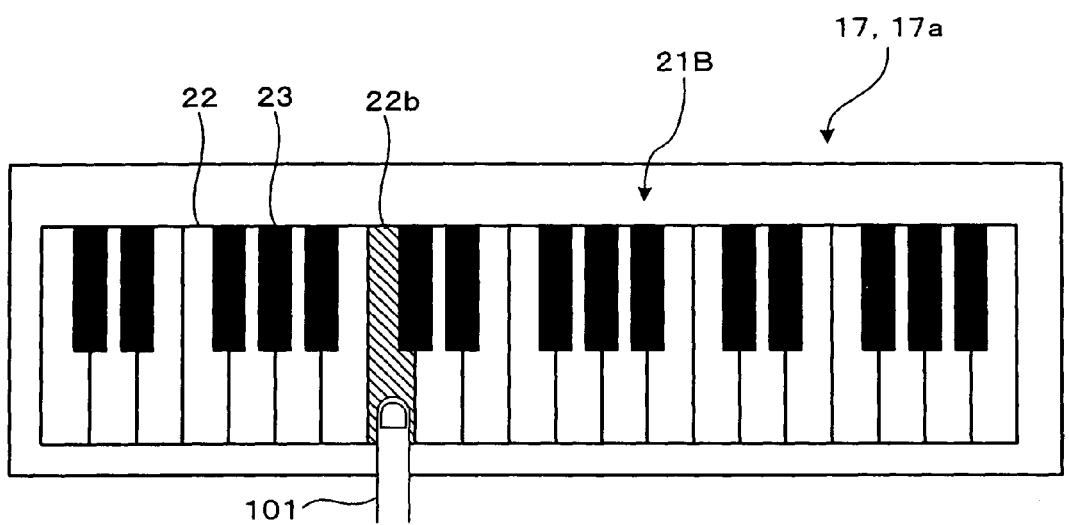
FIG. 2B is a schematic diagram showing a state where a player has operated his/her right index finger in accordance with navigation shown in FIG. 2A.

FIG. 2B shows a state where a player has operated his/her right index finger 101 in accordance with navigation. A key image navigated in FIG. 2A is a "do" key image, and a key image touched with the index finger 101 in FIG. 2B is a "do" key image. When like this a navigated key image and a touched key image are identical, the key image 22a that is displayed in red in FIG. 2A is changed to a key image 22b that is displayed in green in FIG. 2B. Consequently, the keyboard image 21A shown in FIG. 2A changes to a keyboard image 21B shown in FIG. 2B.

Figure 3B:
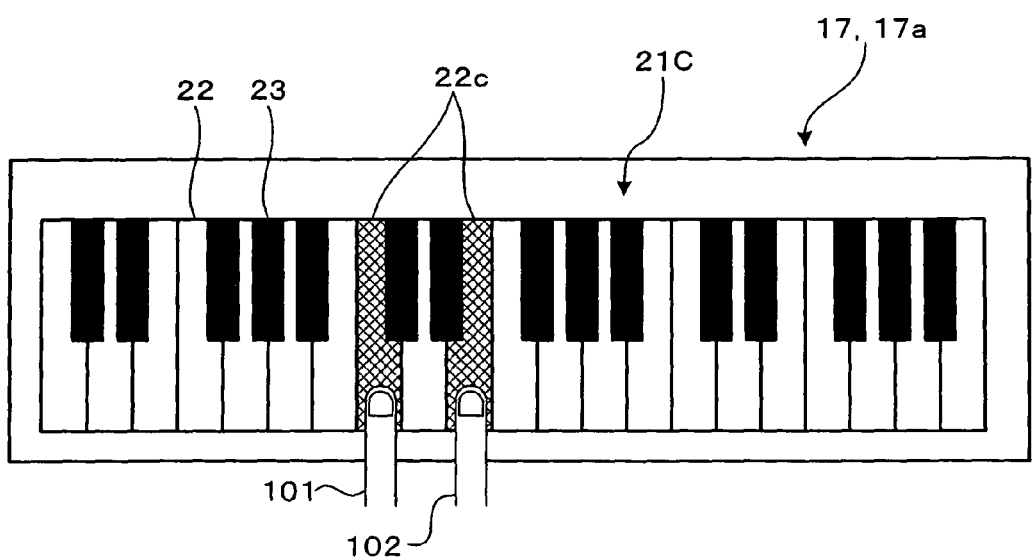
FIG. 3B is a schematic diagram showing a state where a player has simultaneously operated his/her right index finger and right middle finger in accordance with navigation shown in FIG. 3A.

FIG. 3B shows a state where a player has simultaneously operated his/her right index finger 101 and right middle finger 102 in accordance with navigation. In FIG. 3A, navigated key images are a "do" key image and a "mi" key image. In FIG. 3B, two key images simultaneously touched with the index finger 101 and the middle finger 102 are a "do" key image and a "mi" key image. When like this navigated key images and touched key images are identical, the two key images 22a that are displayed in red in FIG. 3A are changed to two key images 22c that are displayed in blue in FIG. 3B. Consequently, the keyboard image 21A' shown in FIG. 3A changes to a keyboard image 21C shown in FIG. 3B.

As shown in FIGS. 2A and 2B, when one key image 22a is touched, the keyboard image 21A changes to the keyboard image 21B including the key image 22b that is displayed in green. As shown in FIGS. 3A and 3B, when two key images 22a are touched simultaneously, the keyboard image 21A' changes to the keyboard image 21C including the two key images 22c that is displayed in blue. That is, a keyboard image displayed on the first LCD 17 changes in accordance with the number of key images simultaneously touched.

When a key image different from the navigated key image 22a is touched, a tone corresponding to the touched key image is outputted from the speaker 32. However, this tone is out of harmony with the piece of music. Thus, a display color of the key image does not change, and therefore the keyboard image does not change, either. In addition, when none of the key images 22, 23 have been touched for a predetermined period of time, e.g., one second, since the navigated key image 22a was displayed, it is considered that a player has missed a play timing and the keyboard image is reset without outputting any tone. At this time, the navigated key image 22a is returned to the normal key image 22, 23.

The "do" key image is navigated in FIG. 2, and the two "do" and "mi" key images are navigated in FIG. 3A. However, a navigated key image may change along with progress of a music play. For example, in a case where a "si" key image is navigated by red display, the "si" key image 22a displayed in red is changed to a key image 22b displayed in green on a condition that the navigated key image 22a is touched.

Figure 4:
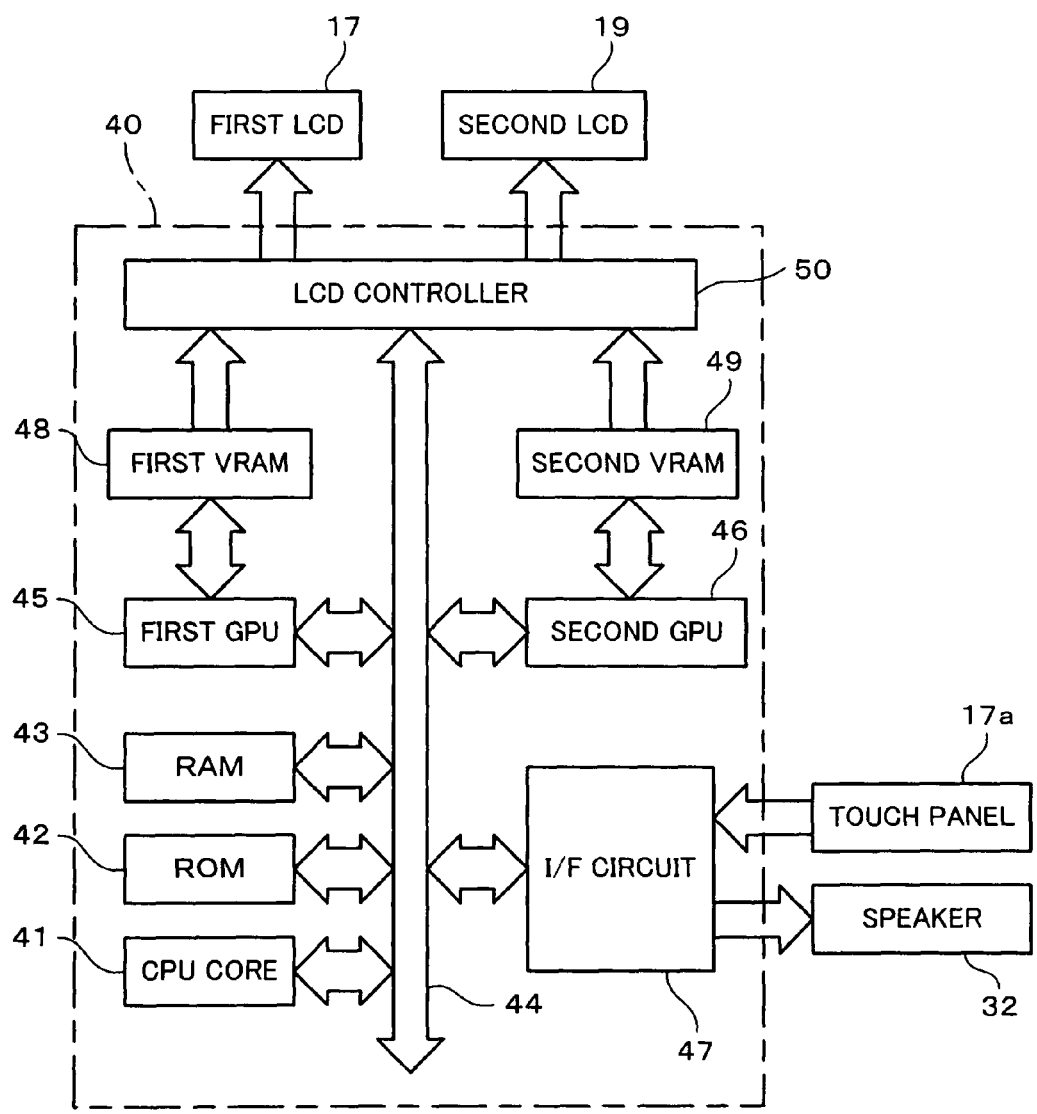
FIG. 4 is a block diagram showing an electrical construction of the gaming apparatus.

Next, an electrical construction of the gaming apparatus 1 will be described. As shown in FIG. 4, the gaming apparatus 1 includes an electronic circuit board 40 mounted thereon with circuit components such as a CPU core 41 and the like. The CPU core 41 is connected through a bus 44 to a ROM 42, a RAM 43, a first graphic processing unit (hereinafter referred to as a "first GPU") 45, a second graphic processing unit (hereinafter referred to as a "second GPU") 46, an input/output interface circuit (hereinafter referred to as an "I/F circuit") 47, and an LCD controller 50.

In executing a later-described game processing routine, the CPU core 41 displays a game screen such as the keyboard image on the first LCD 17 and game-related images and the like on the second LCD 19, respectively, starts and executes a game, outputs a sound that corresponds to a touched point on the touch panel 17a, and calculate scoring points in accordance with a game result.

The ROM 42 unrewritably stores therein a game program, image data, sound data, and the like. The RAM 43 rewritably stores therein temporary data that are dependent on a game progress, such as data about scoring points.

The first GPU 45 and the second GPU 46 have single-chip ASICs for example. Each of the first GPU 45 and the second GPU 46 receives a graphics command from the CPU core 41, and generates game image data in accordance with the graphics command. The CPU core 41 gives not only the graphics command but also an image generating program, which is necessary to generate game-related data, to each of the first GPU 45 and the second GPU 46. The image generating program is included in the game program.

Each of the first GPU 45 and the second GPU 46 accesses the ROM 42 to thereby acquire image data necessary to execute the graphics command.

A first video RAM (hereinafter referred to as a "first VRAM") 48 is connected to the first GPU 45, and a second video RAM (hereinafter referred to as a "second VRAM") 49 is connected to the second GPU 46. The first GPU 45 generates game image data and draw the game image data in the first VRAM 48. The second GPU 46 generates game image data and draws the game image data in the second VRAM 49.

The first VRAM 48 and the second VRAM 49 are connected to the LCD controller 50. The LCD controller 50 outputs to a first LCD 17 the game image data drawn in the first VRAM 48, and outputs to a second LCD 19 the game image data drawn in the second VRAM 49.

In this embodiment, the LCD controller 50 is connected to the first VRAM 48 and the second VRAM 49, and acquires game image data from the VRAMs 48 and 49. However, it may also be possible that game image data drawn in the first and second VRAMs 48 and 49 are, under command of the CPU core 41, transmitted from the first and second GPUs 45 and 46 to the LCD controller 50.

The touch panel 17a and the speaker 32 are connected to the I/F circuit 47. Through the I/F circuit 47, the CPU core 41 receives a position signal from the touch panel 17a. In addition, the CPU core 41 reads out of the ROM 42 sound data necessary for a game, such as a piece of music used in the game, tones corresponding to the respective key images 22, 23, and the like, and outputs the sound data from the speaker 32 through the I/F circuit 47.

Next, an operation of the gaming apparatus 1 will be described.

When powered on, the gaming apparatus 1 executes a game processing routine and other control programs apparently concurrently. A musical game is executed based on the game processing routine. More specifically, a piece of music for a game is played, and a key image to be touched by a player is navigated, a tone corresponding to a key touched by a player is outputted, and scoring points are calculated out.

Figure 5:
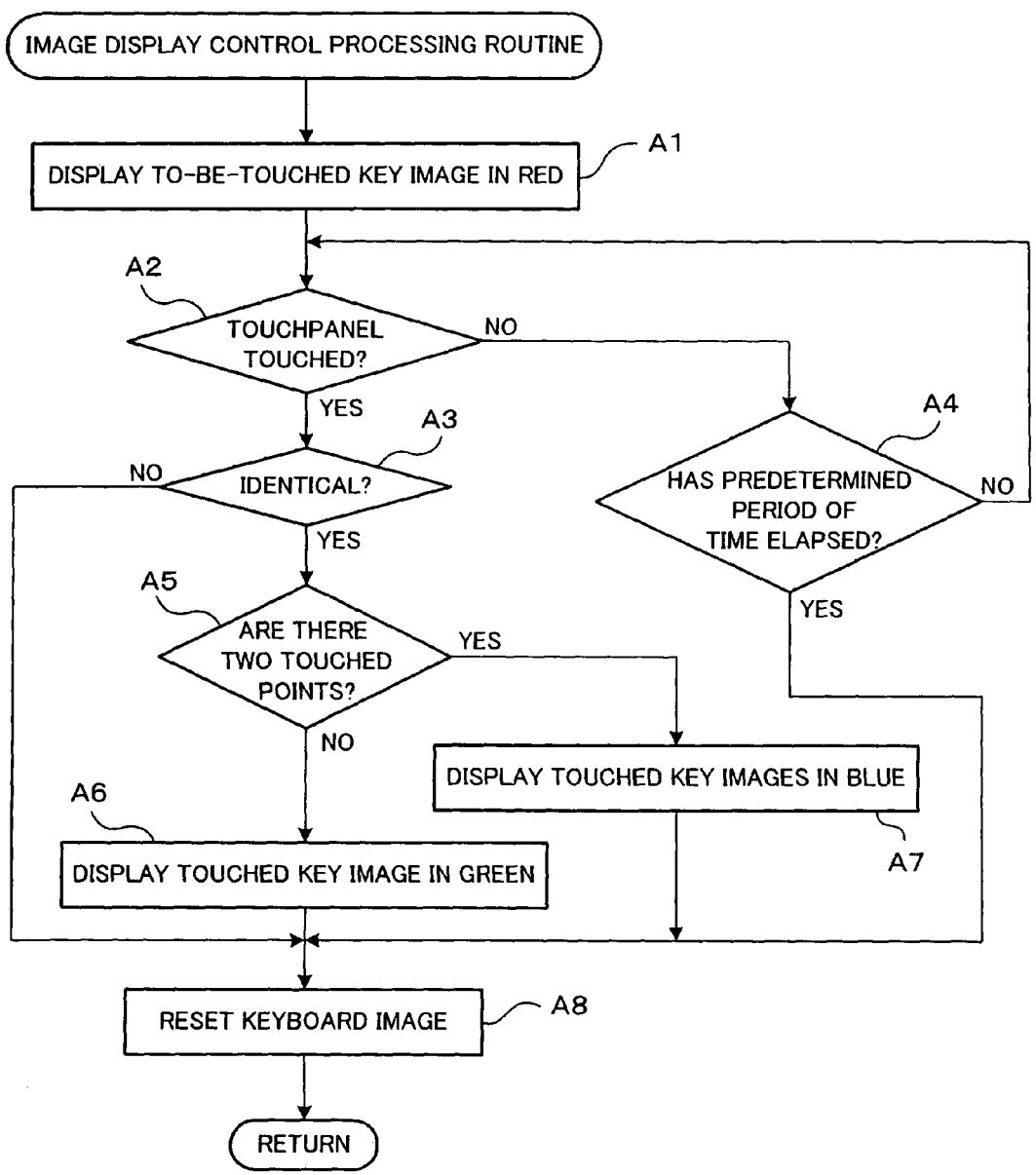
FIG. 5 is a flowchart showing an image display control processing routine.

The gaming apparatus 1 executes an image display control processing routine shown in FIG. 5, concurrently with the above-mentioned game processing routine. In the image display processing routine, first, navigation is made by displaying in red a key image 22a to be touched by a player as shown in FIGS. 2A and 3A (A1). Then, whether the touch panel 17a has been touched or not is determined (A2). When the touch panel 17a has not been touched (A2: NO), then whether a predetermined period of time, e.g., one second, has elapsed or not is determined (A4). When the predetermined period of time has not elapsed (A4: NO), the processing returns to the step A2 for receiving an input made by the player. When the predetermined period of time has elapsed (A4: YES), the keyboard image is reset (A8). That is, the key image 22a displayed in red is returned to a normal key image 22, 23, and then the routine ends. In this case, no tone is outputted from the speaker 32, and the player obtains no scoring point.

When the touch panel 17a is touched (A2: YES), then whether a touched point is identical to the navigated key image or not is determined (A3). When the touched point is not identical to the navigated key image (A3: NO), the keyboard image is reset (A8). That is, the key image 22a displayed in red is returned to a normal key image 22, 23, and then the routine ends. In this case, a tone not corresponding to the navigated key image, that is, a wrong tone, is outputted from the speaker 32, and the player obtains no scoring point. When the touched point is identical to the navigated key image (A3: YES), then whether the number of touched points is two or not is determined (A5). When the number of touched points is not two (A5: NO), the touched key image 22b is displayed in green as shown in FIG. 2B (A6). Then, the keyboard image 21B is reset (A8). That is, the key image 22b displayed in green is returned to a normal key image 22, 23, and then the routine ends. In this case, a tone corresponding to the navigated key image, that is, a correct tone, is outputted from the speaker 32, and the player obtains scoring points. When the number of touched points is two (A5: YES), the touched key images 22c are displayed in blue as shown in FIG. 3B (A7). Then, the keyboard image 21C is reset (A8). That is, the key images 22c displayed in blue are returned to normal key images 22, 23, and then the routine ends. In this case, tones corresponding to the navigated key images, that is, correct tones, are outputted from the speaker 32, and the player obtains scoring points.

As thus far described above, in the gaming apparatus 1 of this embodiment, a keyboard image displayed on the first LCD 17 changes in accordance with the number of key images that are simultaneously touched. For example, the keyboard image 21B displayed when the touch panel 17a is touched with one finger as shown in FIG. 2B and the keyboard image 21C displayed when the touch panel 17a is touched simultaneously with two fingers as shown in FIG. 3B are different from each other. This can provide a player with a game feature based on a visible change, thus improving a game feature obtainable from a touch-panel input.

A key image navigated by red display changes along with progress of a music play. When a navigated key image 22a changes and consequently a touched point on the touch panel 17a changes, a position signal outputted from the touch panel 17a also changes. Accordingly, an image displayed after touching, that is, a keyboard image including a key image displayed in a different color also changes. This provides a wider variation of visible changes.

In the above-described embodiment, a game is executed while navigating a key image to be touched by a player with his/her index finger 101 or with his/her index and middle fingers 101 and 102. However, this is not limitative, and navigation may be made for any finger of either right and left hand of the player.

In the above-described embodiment, the maximum number of key images to be simultaneously touched by a player is two, but it may arbitrarily be changed. For example, it may be possible that a player simultaneously touches ten key images with all of his/her fingers of both hands and that a display color of the key image after changed is differentiated in accordance with the number of fingers having touched the touch panel 17a. That is, the number of simultaneously-touched points on the touch panel 17a, which means the number of position signals simultaneously outputted from the touch panel 17a, may be various. In this case, it may be possible that an image after changed differs in accordance with the number of position signals simultaneously outputted from the touch panel 17a.

A game playable in the gaming apparatus 1 is not limited to a musical game that makes a player touches a key image in accordance with a music play as in the above described embodiment. For example, a game that makes a player listen a chord outputted from the speaker 32 and reproduce the chord may also be acceptable. In this case as well, the number of simultaneously-touched key images changes.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An apparatus comprising:
   a display that displays an image thereon;
   a touch panel that is provided in the display and outputs a position signal corresponding to a point touched by a player; and
   a controller that receives the position signal from the touch panel and changes a display content displayed in the display in accordance with a number of position signals simultaneously received so that the display content is changed in accordance with a number of fingers simultaneously touching the touch panel,
   wherein the display content displayed in the display when the number of fingers is a first integer is different from the display content displayed in the display when the number of fingers is a second integer being different from the first integer, and the first integer and the second integer are greater than zero.

2. The apparatus according to claim 1, wherein the controller differentiates a changed image based on the position signal.

3. A method of controlling image display of a gaming apparatus, the method comprising:
   receiving a position signal from a touch panel that is provided in a display on which an image is displayed and which outputs the position signal corresponding to a point touched by a player; and
   changing a display content displayed in the display in accordance with the number of position signals simultaneously received so that the display content is changed in accordance with the number of fingers simultaneously touching the touch panel,
   wherein the display content displayed in the display when the number of fingers is a first integer is different from the display content displayed in the display when the number of fingers is a second integer being different from the first integer, and the first integer and the second integer are greater than zero.

4. The method according to claim 3, wherein a changed displayed content differentiates a changed image based on the position signal.

5. The apparatus according to claim 1, further comprising a memory that stores a first image corresponding to a first number of fingers simultaneously touching the touch panel and a second image corresponding to a second number of fingers simultaneously touching the touch panel,
   wherein the controller displays on the display either one of the first image and the second image that are stored in the memory, in accordance with the number of fingers touching the touch panel.

6. The method according to claim 3, further comprising:
   referring to a memory that stores a first image corresponding to a first number of fingers simultaneously touching the touch panel and a second image corresponding to a second number of fingers simultaneously touching the touch panel; and
   displaying on the display either one of the first image and the second image that are stored in the memory, in accordance with the number of fingers touching the touch panel.

7. A non-transitory computer-readable recording medium that stores a program that is executable by a computer, the program comprising:
   receiving a position signal from a touch panel that is provided in a display on which an image is displayed and which outputs the position signal corresponding to a point touched by a player; and
   changing a display content displayed in the display in accordance with the number of position signals simultaneously received so that the display content is changed in accordance with the number of fingers simultaneously touching the touch panel,
   wherein the display content displayed in the display when the number of fingers is a first integer is different from the display content displayed in the display when the number of fingers is a second integer being different from the first integer, and the first integer and the second integer are greater than zero.

8. The non-transitory computer-readable recording medium according to claim 7, wherein a changed displayed content differentiates a changed image based on the position signal.

9. The non-transitory computer-readable recording medium according to claim 7, further comprising:
   referring to a memory that stores a first image corresponding to a first number of fingers simultaneously touching the touch panel and a second image corresponding to a second number of fingers simultaneously touching the touch panel; and
   displaying on the display either one of the first image and the second image that are stored in the memory, in accordance with the number of fingers touching the touch panel.

* * * * *